United States Patent [19]

Savedra, Jr.

[11] Patent Number: 5,009,558
[45] Date of Patent: Apr. 23, 1991

[54] TREE LIFTER

[76] Inventor: Emilio Savedra, Jr., 426 Charleston NE., Albuquerque, N. Mex. 87108

[21] Appl. No.: 437,113

[22] Filed: Nov. 16, 1989

[51] Int. Cl.⁵ ........................ A01G 23/02; B66F 11/00
[52] U.S. Cl. ........................................ 414/23; 294/16; 294/114
[58] Field of Search ................ 254/132; 294/16, 113, 294/114; 414/23

[56] References Cited

U.S. PATENT DOCUMENTS

| | | | |
|---|---|---|---|
| 809,003 | 1/1906 | Mitchell | 294/16 |
| 2,367,889 | 1/1945 | Radtke | 294/16 |
| 2,603,525 | 7/1952 | Stotts | 294/113 |
| 3,311,350 | 3/1967 | Irwin | 414/23 |
| 3,410,420 | 11/1968 | Butts | 414/23 |
| 3,507,533 | 4/1970 | Beattie | 294/16 |
| 3,778,098 | 12/1973 | Tawara | 296/3 |
| 3,848,850 | 11/1974 | Bemis | 254/30 |

FOREIGN PATENT DOCUMENTS 1285059  8/1972  United Kingdom ................ 294/113

Primary Examiner—David A. Bucci
Assistant Examiner—Janice Krizek

[57] ABSTRACT

A tree-lifter mechanism operable by two people standing at opposite ends of the mechanism. Two elongated handles are pivotably connected to the ends of a horizontal support frame that is adapted to span an upright tree. Saddles on the inner ends of the handles exert clamp forces on the tree surfaces when lifting forces are exerted on the outer ends of the elongated handles.

4 Claims, 1 Drawing Sheet

TREE LIFTER

This invention relates to a mechanism usable by two persons for lifting and moving a free-standing tree. The mechanism can also be used for moving or shifting heavy vertical posts that might be difficult for one person to handle (because of weight considerations and center-of-gravity concerns). The invention is intended primarily for use by persons employed in tree nurseries, when replanting trees or moving trees to or from a truck, e.g. when delivering a tree to a homeowner. The invention might also prove useful to forest conservation personnel, or to ranch personnel when installing heavy fence corner posts, or to homeowners when replanting trees.

The invention contemplates a horizontal elongated support frame adapted to span a free-standing tree, and two elongated handles pivotably connected at opposite ends of the frame for swinging motions in vertical planes on either side of the tree. Confronting ends of the handles carry tree-engagement saddles.

Two people are required to operate the tree lifter mechanism. Each person exerts a lifter force on the outer end of one of the handles so that the saddles swing in downward arcs against side surfaces of the tree. With the saddles clamped against the tree surfaces, the two people simultaneously continue to exert lift actions on the outer ends of the handles; the weight of the tree causes the saddles and inner portions of the handles to act as wedges, such that the tree is firmly held between the saddles without slippage.

The two persons can move the tree from place to place by gripping the handles and walking straight ahead or side to side. The lifter mechanism can be used to lift trees with diameters of up to about eight or ten inches, and with weights up to about four hundred pounds, depending on the physical capabilities of the people operating the mechanism.

The mechanism is advantageous in that the weight of the tree is handled by two people, rather than one; heavier trees can be handled. Also, the mechanism is designed so that the two people are spaced apart about six feet, with the root ball of the tree between them; the diameter of the root ball does not prevent the men from effectively reaching the tree or walking in normal fashion (without stumbling over the root ball).

A further advantage of the mechanism is that it permits two persons to lift a tree (or post) without imposing excessive stress (strain) on their back muscles. The two people can stand essentially upright while lifting or moving a tree. They do not have to bend over to any great extent in order reach or lift the tree.

BRIEF DESCRIPTION OF THE INVENTION

BRIEF DESCRIPTION OF A PREFERRED EMBODIMENT OF THE INVENTION

Figure 1:
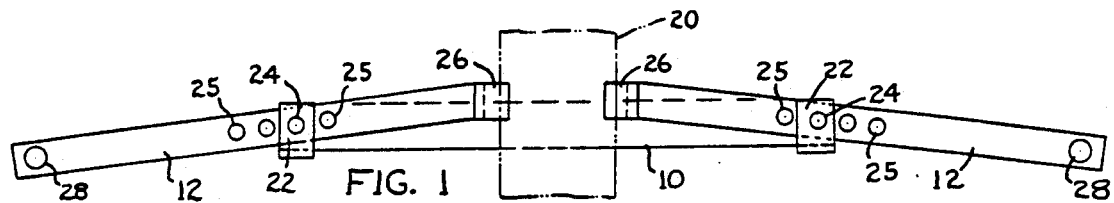
FIG. 1 is a side elevational view of an apparatus embodying the invention.
Figure 2:
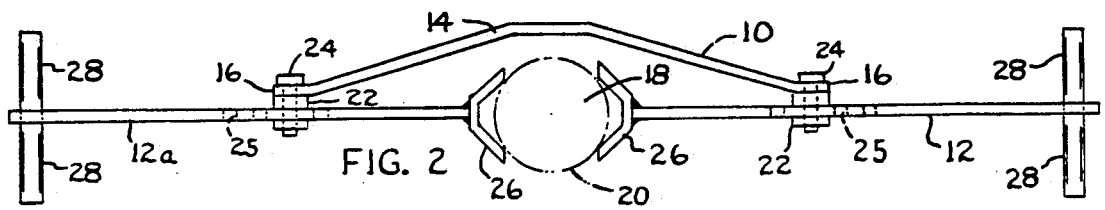
FIG. 2 is a top plan view of the FIG. 1 apparatus.
Figure 4:
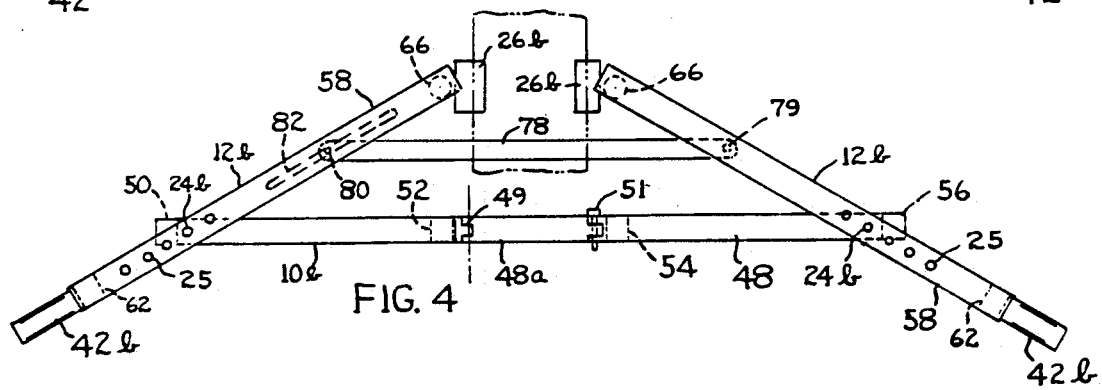
FIG. 4 is a side elevational view showing another form that the invention can take.
Figure 5:
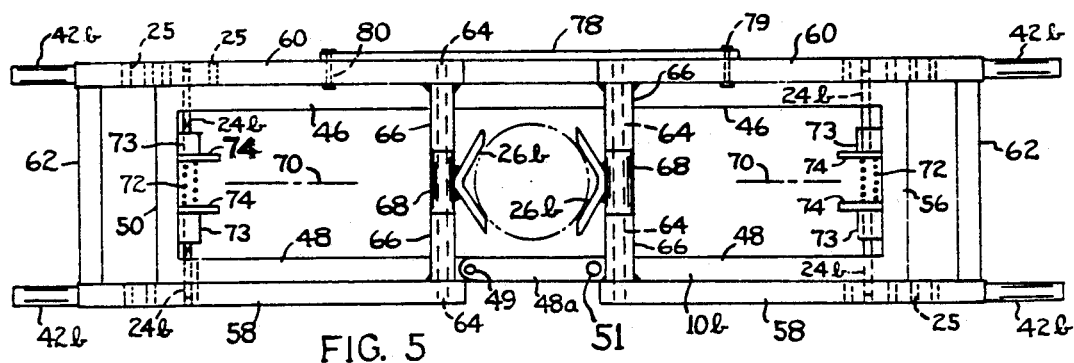
FIG. 5 is a top plan view of the mechanism shown in FIG. 4.

FIGS. 1 and 2 show a simplified form of the invention that illustrates some of its advantages. FIGS. 4 and 5 show a more complex construction that has some advantages not possessed by the structure of FIGS. 1 and 2. FIGS. 4 and 5 illustrate a preferred form of the invention.

Referring to FIGS. 1 and 2, there is shown a tree lifter mechanism that includes a horizontally elongated frame 10 and two similarly constructed handles 12. Frame 10 comprises a rectangular cross-sectioned bar that is bent, as shown in FIG. 2, so that its midpoint 14 is offset from its ends 16. Ends 16 are on a horizontal line passing through a central tree-reception space 18; an upstanding tree is designated by numeral 20.

At its opposite ends bar (frame) 10 has attached thereto short channels 22. Elongated handles 12 take the form of straight rectangular cross-sectioned bars extending through channels 22. A pivot pin 24 extends through aligned circular holes in each channel 22 and the associated handle 12. Each handle 12 can swing in a vertical plane freely around the associated horizontal pivot pin 24.

The confronting free (inner) ends of elongated handles 12 have V-shaped saddles 26 attached thereto; resilient linings (not shown) may be applied to the V-surfaces. The outer ends of handles 12 carry transversely extending handgrip members (tubes or circular bars) 28. Handgrip members 28 are long enough in the transverse direction for a person standing beyond the ends of the handles to grip each member 28 with both of his hands, to thereby exert lift forces on the handles.

The tree lifter mechanism is a portable item that can be manipulated so that saddles 26 are loosely engaged against opposite surfaces of a tree trunk 20. In a nursery environment, the tree may be a freshly dug tree having an exposed root ball seated in a freshly dug hole. Alternatively, the tree can have its root system contained in earth within a large pot. With saddles 26 loosely engaged against opposite side surfaces of the tree trunk, manual lift forces can be applied to handgrip sections 28. Handles 22 will automatically swing around pivots 24 so that saddles 26 have increased pressure engagement with the tree surfaces The weight of the tree exerts wedge forces on the saddles, thereby increasing the tree gripping action of the saddles. Upward motions of handgrip sections 28 (by two people) produces a tree lifting action. The two people can then walk (move) the tree to a new location, e.g. to a truck or to another planting site.

The mechanism is preferably designed to handle a range of different diameter tree trunks, e g. from one inch up to about eight or ten inches. This is accomplished by building adjustments into the mechanism so that the spacing between the saddles can be varied (when the saddles are in their tree-engagement positions). In the mechanism of FIGS. 1 and 2, the saddle spacing adjustment means takes the form of a series of pivot holes 25 formed in each handle 12 at longitudinally spaced points therealong. To change the saddle spacing each pin 24 is removed from the aligned holes in channel 22 and handle 12, after which the handle is adjusted in the channel so that a different hole 25 in the handle is aligned with the holes in channel 22; pin 24 is then inserted into the newly aligned holes.

In preferred practice of the invention the tree diameters associated with each hole 25 will be marked on handle 12 in near adjacency to each hole 25. The diameter of the tree will be measured, or otherwise determined, when making any hole 25-pin 24 adjustments. A given hole 25 can be used for more than one size tree trunk, since handles 12 do not need to have the precise angulation shown in FIG. 1. Handle 12 can be more steeply angled (sloped), as shown e.g. in FIG. 4. With handles 12 more steeply angled, saddles 26 would be further apart for any given hole 25 placement The tree size markings on handles 12 will be approximations.

Figure 3:
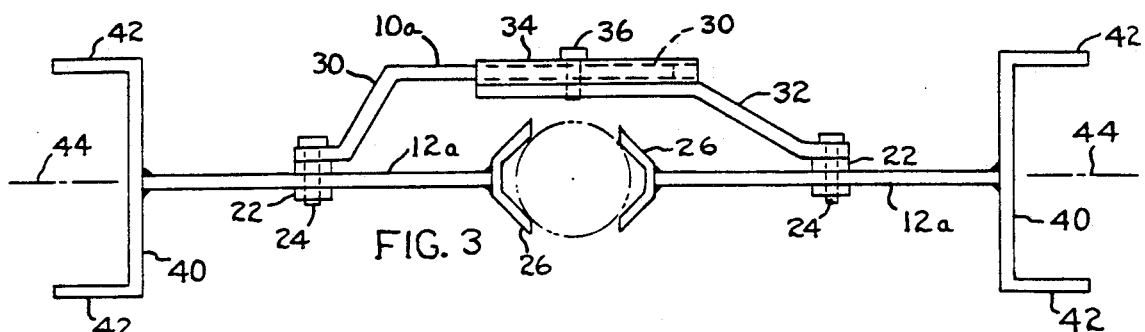
FIG. 3 is a top plan view of another apparatus embodying the invention.

FIG. 3 illustrates an apparatus that is generally similar to the FIG. 1 apparatus, except that a different structural arrangement is used to adjust the effective spacing between saddles 26. In FIG. 3 the support frame 10a is formed by two separate bar sections 30 and 32. Bar section 32 carries a rectangular cross-sectioned tube 34 that slidably accommodates a portion of bar section 30. This portion of bar section 30 has a number of holes therethrough adapted to selectively mate with aligned holes in tube 34 and bar section 32; a removable pin 36 extends through the aligned holes to hold bar sections 30 and 32 in a given position of longitudinal adjustment. By repositioning bar section 30 so that it has a different hole mated to pin 36 it is possible to change the length of support frame 10a and hence the spacing between pivot pins 24.

In the FIG. 3 mechanism pivot pins 24 remain in a given location on handles 12a. Adjustment of the saddle 26 spacing is achieved by changing the effective length of support frame 10a.

In the FIG. 3 arrangement the handgrip sections are formed by U-shaped bars 40 that are welded or otherwise attached to the outer ends of handles 12a. The U-shaped bars define handgrip sections 42 that extend parallel to the imaginary longitudinal centerline 44 of handles 12a. A person can stand between each pair of handgrip sections 42 and grip them as he would grip the handles of a wheelbarrow.

FIGS. 4 and 5 illustrate another form of the invention wherein the support frame 10b is formed as a ladder-like structure. The support frame comprises two longitudinal bars (rectangular tubes) 46 and 48 that are connected by four transverse bars (tubes) 50, 52, 54 and 56. As above noted, the support frame has a ladder-like appearance when viewed in the top plan direction (FIG. 5).

Each handle 12b comprises two longitudinal bars (tubes) 58 and 60 interconnected by a tube 62 near its outer end and a shaft (rod) 64 at its inner end Sleeves 66 are attached to bars 58 and 60 in surrounding relation to rods 64. V-shaped saddles 26b are attached to sleeves 68 that are rotatably carried on shafts 64 between sleeves 66. In this manner each saddle is pivotably connected to the associated handle 12b, such that each saddle can engage a vertical section of a tree surface while the confronting end of the associated handle is swinging in a downward arc. The saddle thus conforms to the tree contour and has an increased surface area facially engaged with the tree surface.

Each handle 12b is pivotably connected to support frame 10b by pivot pins 24b. Each pivot pin is a retractable pin; these pins are slidably guided by guide sleeves 73 attached to bars 50 or 56. Each pin is biased away from the longitudinal mid plane 70 of the frame by coil spring means 72. Handles 74 on the inner ends of pins 24b can be squeezed together to withdraw the pins from holes 25 in bars 58, 60. By retracting pins 24b from bars 58 and 60 it is possible to reinsert the pins into a different set of holes 25 in bars 58 and 60, thereby adjusting the spacing between saddles 26b.

In use of the apparatus of FIGS. 4 and 5, each person stands at an outer end of a handle 12b in the space between handgrip sections 42b. By lifting the handgrip sections the handles are caused to swing in vertical planes so that saddles 26b are clamped to the tree surfaces. The weight of the tree causes the tree to be wedged tightly between the confronting saddles.

In order to permit frame 10b to span the tree trunk in both directions (right and left), bar 48 is formed with a break (space) A swingable section 48a of the bar is movable (swingable) in the break space around a hinge structure 49, to permit frame 10b to assume a position wherein saddles 26b extend beyond opposite sides of a tree trunk. After frame 10b is in position section 48a of bar 48 can be swung back and locked in place by means of a lock pin 51.

In use of the apparatus, the two handles 12b should preferably be lifted at the same time and by the same amount (same arcuate distance). This will keep frame 10b in a generally horizontal position and the tree in a generally vertical upright stance, with each person carrying substantially the same weight (load). In order to ensure approximately equal arcuate movements of the two handles 12b, the two handles are linked together by means of an elongated link member 78. One end of the link member has a pivot connection 79 with the right most handle 12b. The other end of link member 78 has a pin 80 that extends through an elongated straight slot 82 formed in bar 60 of the left most handle 12b.

Link member 79 connects the two handles 12b so that both handles move approximately the same arcuate distance around pivots 24b when lift forces are applied to handgrip sections 42b. If one handle tends to swing more than the other handle, link 78 will constrain the other handle to move as far as the one handle. In an ideal situation, link member 78 will have a horizontal position; the tree trunk will extend vertically, with approximately equal portions of the tree weight being borne by each person.

The apparatus will be sized so that handgrip sections 42b are spaced a considerable distance apart, e.g. about six feet. The root ball of the tree will be located between the two people; however the two people are spaced a sufficient distance that they can walk or otherwise shift their feet without striking the root ball and thus stumbling.

FIG. 4 shows the two handles 12b in steeply sloped positions in order to illustrate the fact that there can be some latitude in handle inclination while still achieving a tree-lifting action. FIG. 1 is more representative of the handle inclinations that would be used. With the handles less steeply sloped, as in FIG. 1, the tree-gripping saddles are closer to the ground surface and more nearly in the same horizontal plane as the hands of the persons doing the lifting; this makes for a more stable arrangement wherein the tree is less likely to tip. In the case of small trees this wouldn't be important. With larger trees stability becomes more important.

I claim:

1. A mechanism for lifting and manually transporting an upstanding tree, comprising a horizontally elongated support frame adapted for horizontal disposition alongside a tree to be lifted, said frame having a longitudinal axis and a transverse axis; two similarly-constructed elongated handles, each having a manually-grippable end and a free end; the free ends of the handles being relatively close together, and the manually-grippable ends of the handles being spaced relatively far apart; a transverse horizontal-axis pivot means connecting each elongated handle to the support frame, whereby each elongated handle can be manually swung in a vertical plane paralleling the frame longitudinal axis; each pivot means being located at approximately the longitudinal midpoint of the associated handle, said pivot means being spaced apart along the longitudinal axis of the support frame such that the handles have their free ends in confronting relation to a standing tree; and a tree-engageable saddle carried on the free end of each handle, whereby the weight of the engaged tree exerts wedge forces on the portions of the handles between the saddles and the respective pivot means.

2. A mechanism for lifting and manually transporting an upstanding tree, comprising a horizontally elongated support frame adapted for horizontal disposition alongside a tree to be lifted, said frame having a longitudinal axis and a transverse axis; two similarly-constructed elongated handles, each having a manually-grippable ends of the handles being spaced relatively far apart; a transverse horizontal-axis pivot means connecting each elongated handle to the support frame, whereby each elongated handle can be manually swung in a vertical plane paralleling the frame longitudinal axis; the respective pivot means being spaced apart along the longitudinal axis of the support frame such that the handles have their free ends in confronting relation to a standing tree; a tree-engageable saddle carried on the free end of each handle, whereby the weight of the engaged tree exerts wedge forces on the portions of the handles between the saddles and the respective pivot means; and means for adjusting the spacing between the saddles; said frame being comprises of two slidably-engaged frame sections adjustable along the frame longitudinal axis to thereby adjust the spacing between the two pivot means; said pivot means having fixed locations on the respective handles, such that slidable adjustment of the frame sections is effective to adjust the spacing between the saddles.

3. A mechanism for lifting and manually transporting an upstanding tree, comprising a horizontally elongated support frame adapted for horizontal disposition alongside a tree to be lifted, said frame having a longitudinal axis and a transverse axis; two similarly-constructed elongated handles, each having a manually-grippable end and a free end; the free ends of the handles being relatively close together, and the manually-grippable ends of the handles being spaced relatively far apart; a transverse horizontal-axis pivot means connecting each elongated handle to the support frame, whereby each elongated handle can be manually swung in a vertical plane paralleling the frame longitudinal axis; the respective pivot means being spaced apart along the longitudinal axis of the support frame such that the handles have their free ends in confronting relation to a standing tree; a tree-engageable saddle carried on the free end of each handle, whereby the weight of a saddle-engaged tree exerts wedge forces on the portions of the handles between the saddles and the respective pivot means; and means for adjusting the spacing between the saddles; said adjusting means comprising a series of longitudinally-spaced pivot holes in each handle; each said pivot means comprising a pivot pin extending through said frame and a selected pivot hole in the associated handle.

4. The mechanism of claim 3, and further comprising a link member extending between the two handles for causing each handle to swing the same distance around its respective pivot means; said link member having a pivotal connection with one handle and a pin-slot connection with the other handle.

* * * * *